United States Patent [19]
Wills et al.

[11] Patent Number: 5,838,144
[45] Date of Patent: Nov. 17, 1998

[54] SOLID STATE, REDUCED VOLTAGE MOTOR STARTER ENABLING EQUALIZED INPUT/OUTPUT VOLT-AMP RATINGS

[75] Inventors: Frank E. Wills; Harold R. Schnetzka, both of York, Pa.

[73] Assignee: York International Corporation, Pa.

[21] Appl. No.: 852,502

[22] Filed: May 7, 1997

[51] Int. Cl.$^6$ ................................. G05F 1/10; H02P 1/26
[52] U.S. Cl. ........................ 323/238; 323/241; 323/220; 318/778
[58] Field of Search .................................. 323/238, 239, 323/241, 901, 220; 318/778

[56] References Cited

U.S. PATENT DOCUMENTS

| | | | |
|---|---|---|---|
| 3,896,369 | 7/1975 | Nakata | 323/238 |
| 4,408,268 | 10/1983 | Peters et al. | 363/62 |
| 4,668,908 | 5/1987 | Aoki et al. | 323/239 |
| 4,965,508 | 10/1990 | Soan | 323/239 |

*Primary Examiner*—Peter S. Wong
*Assistant Examiner*—Bao Q. Vu
*Attorney, Agent, or Firm*—Finnegan, Henderson, Farabow, Garrett & Dunner, L.L.P.

[57] ABSTRACT

A motor starter circuit for minimizing the amount of current drawn by the motor from a power source during starting of the motor through current transformation achieved by selectively controlling actuation of a plurality of high speed switches. The circuit is for use with a alternating current power source that provides positive and negative voltage alternations, and an alternating current motor. The motor starter circuit comprises a first bidirectional switch through which line current from the power source is provided to the motor, and a pair of switch-diode combinations electrically configured to carry the current in the motor when the bidirectional switch, which is controlled to cycle between an open and a closed position, is in an open position. Actuation of the pair of switch-diode combinations is controlled based on the polarity of the motor current alternation. The resulting current transformation minimizes the current drawn by the motor during starting, and enables equalized input volt-amp product and output volt-amp product. The starting current drawn is reduced from the available line current in proportion to the duty cycle of the bidirectional switch.

16 Claims, 6 Drawing Sheets

SOLID STATE, REDUCED VOLTAGE MOTOR STARTER ENABLING EQUALIZED INPUT/OUTPUT VOLT-AMP RATINGS

TECHNICAL FIELD

The present invention relates to starter circuits for heating, ventilating, and air conditioning (HVAC) motors and, more particularly, to a multi-phase motor starter circuit and control strategy for minimizing starting current and selectively control the line current drawn by a motor during starting using current transformations.

BACKGROUND ART

In many applications, it is desirable to minimize the current drawn by a multi-phase motor during starting. Starting, or in-rush, current for multi-phase motors tends to be 5–6 times the running current. Such high currents have many detrimental effects on the equipment and the power, as well as the economics of power usage. By means of example only, drawing such normal starting currents over a long power line can cause the voltage to essentially collapse, leaving insufficient voltage to accomplish the task. Furthermore, other customers along the same power line may experience undesirable voltage fluctuations during the start of the motor. To discourage this situation, power companies, especially in Europe, impose penalties if a customer's starting or in-rush currents are excessive.

Use of an autotransformer is one known methodology for achieving lower motor starting currents. Autotransformers, however, are relatively inflexible compared to the present invention in that the turns ratio of an autotransformer is established up front and remains fixed by the design of the components. Another approach employs the use of series elements such as inductors, resistors, and the like, to limit starting current. The latter approach, however, requires significantly higher line currents than autotransformer starters to provide the same amount of torque.

It is, therefore, desirable to provide a starter circuit for a multi-phase motor that minimizes and selectively controls the amount of line current drawn by the motor during starting and that improves over other known reduced-current starter circuits and methodologies, including autotransformers. More particularly, it is desirable to provide a starter circuit for a multi-phase motor that requires the lowest possible starter current. Such a motor starter circuit addresses a waiting need for applications wherein motor starting current must be as low as possible.

SUMMARY OF THE INVENTION

It is, therefore, an object of the present invention to provide a starter circuit for a multi-phase motor that improves over the prior art methods and systems to reduce line current drawn by the motor during starting.

Additional objects and advantages of the invention will be set forth in part in the description which follows, and in part will be appreciated by one of ordinary skill from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a starter circuit, for use with a multi-phase power source providing positive and negative current alternations and a multi-phase motor, for minimizing the amount of current drawn by the motor from the power source during starting of the motor. The motor starter circuit comprises a first switch through which line current from the power source is provided to the motor, and a pair of switch-diode combinations electrically configured to carry current in the motor when the first switch is in an open position. The first switch is controlled to cycle between an open and a closed position, and the pair of switch-diode combinations are controlled, based on the polarity of the current alternation, to alternately carry the current in the motor when the first switch is open, thereby effecting a current transformation to minimize the current drawn by the motor during starting. The starting current drawn is reduced from the available line current in proportion to the duty cycle of the first switch.

The present invention also comprises a starter circuit, for use with a multi-phase power source providing positive and negative current alternations and a multi-phase motor, for minimizing the amount of current drawn by the motor from the power source during starting of the motor. The motor starter circuit comprises, for each phase, a first switch, preferably a bidirectional solid-state switch, disposed between the power source and the motor and electrically connected in series therewith, the first switch being cycled between an open state and a closed stated so as to provide pulse-width-modulated current to the motor. The starter circuit also comprises a second switch electrically connected in series with a first diode, the second switch and first diode being disposed between the first switch and the motor and electrically connected in parallel therewith. A third switch is electrically connected in series with a second diode, the third switch and second diode being disposed between the first switch and the motor and electrically connected in parallel therewith, the second diode being electrically connected so as to be forward biased when the first diode is reverse biased and reverse biased when the first diode is forward biased. During positive motor current alternations, the second switch is maintained in a closed position and the third switch is maintained in an open position such that when the first switch is in an open state, the first diode carries current from the motor. During negative alternations of the motor current, the second switch is maintained in an open position and the third switch is maintained in a closed position such that when the first switch is in an open state, the second diode carries current from the motor, so as to thereby effect a current transformation to minimize the current drawn from the power lines by the motor during starting, the starting current being reduced from the available line current in proportion to the duty cycle of the first switch.

Still further, the present invention comprises an energy sink, disposed between the first switch and the motor and electrically connected in parallel therewith, for use at low power factor values. The energy sink can be a dissipative device or a storage device.

It is to be understood that both the foregoing general description and the following detailed description, taken in connection with the accompanying drawings, are exemplary and explanatory of the principles of the invention as claimed herein.

DETAILED DESCRIPTION OF THE INVENTION

Reference will now be made in detail to the present preferred embodiments of the starter circuit of the present invention as illustrated in FIGS. 2–6. Before describing those embodiments, however, general principles will be described with particular reference to FIGS. 1a–1d.

Figure 1A:
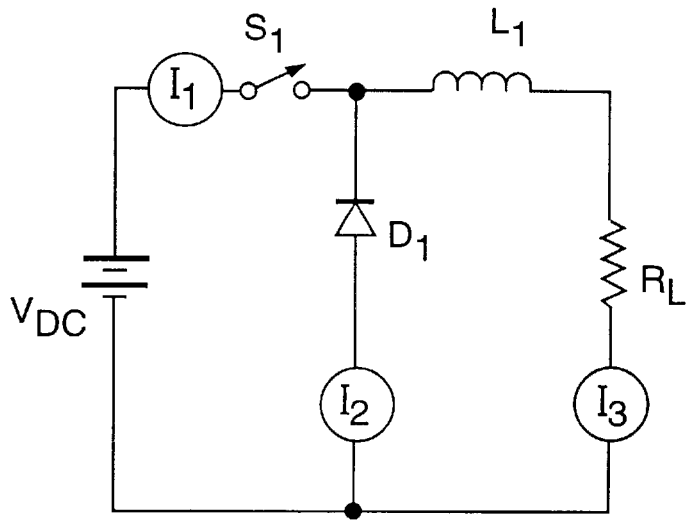
FIG. 1a is a block diagram of a prior art "Buck Converter" circuit for use with a direct current (DC) power supply.

Referring now to FIG. 1a, there is shown a block diagram of a prior art circuit for use with a direct current (DC) power supply. As is known, this switching regulator circuit, commonly referred to as a "Buck Converter" circuit, is useful for converting DC voltage from a higher to a lower value.

Figure 1B:
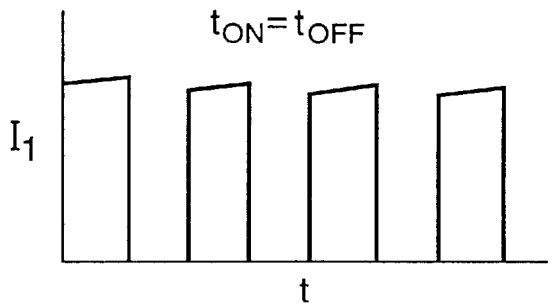
FIGS. 1b–1d are graphical illustrations of the currents $I_1$, $I_2$, and $I_3$, respectively, in the circuit shown in FIG. 1a for a 50% duty cycle.

Generally, an inductor ($L_1$) and switch ($S_1$) are electrically interconnected between the supply ($V_{DC}$) and the resistive load ($R_L$) as shown. Switch $S_1$, is controlled by a controller not specifically illustrated to cycle between an "open" and a "closed" position. FIG. 1b illustrates the current flowing from the power source through the switch $S_1$ as it is opened and closed. As shown, for a 50% duty cycle (i.e. $t_{on}=t_{off}$), the $I_1$ current waveform generally resembles a square-wave. However, instead of remaining constant during switch closure, the magnitude of $I_1$ increases gradually. When the switch $S_1$ is closed, inductor $L_1$ and load $R_L$ complete the circuit and current flows from the power source through $L_1$ and $R_L$.

Figure 1C:
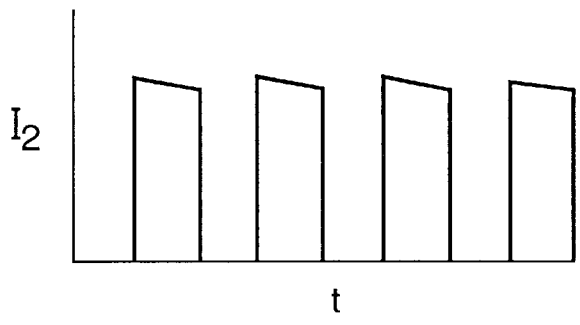

With continuing reference to FIG. 1a, it can be seen that when the switch $S_1$ is opened, current flow from the power source ceases. Diode D1 becomes forward biased (i.e. conducts), completes the circuit, and carries the current flowing in the inductor. FIG. 1c is a graphical illustration of the current $I_2$ flowing through $D_1$ as the switch $S_1$ is opened and closed. As shown, current waveform $I_2$ generally resembles that a square wave with a gradually decreasing magnitude during switch openings.

Figure 1D:
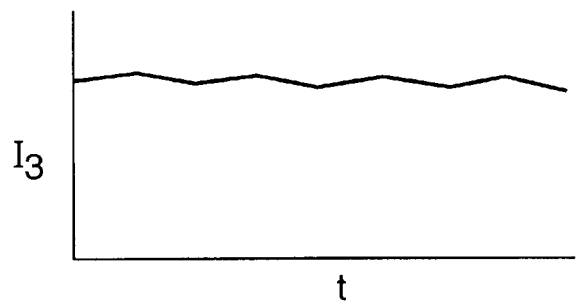

Turning now to FIG. 1d, it can be seen that by providing diode $D_1$ to carry the current flowing in the inductor during the time switch $S_1$ is open, the output current $I_3$ is maintained with little ripple, while the input current alternately ceases and flows in direct proportion to the ratio at the switching rate chosen. This provides DC current and voltage transformations similar to those obtained with a transformer in AC applications.

Figure 2:
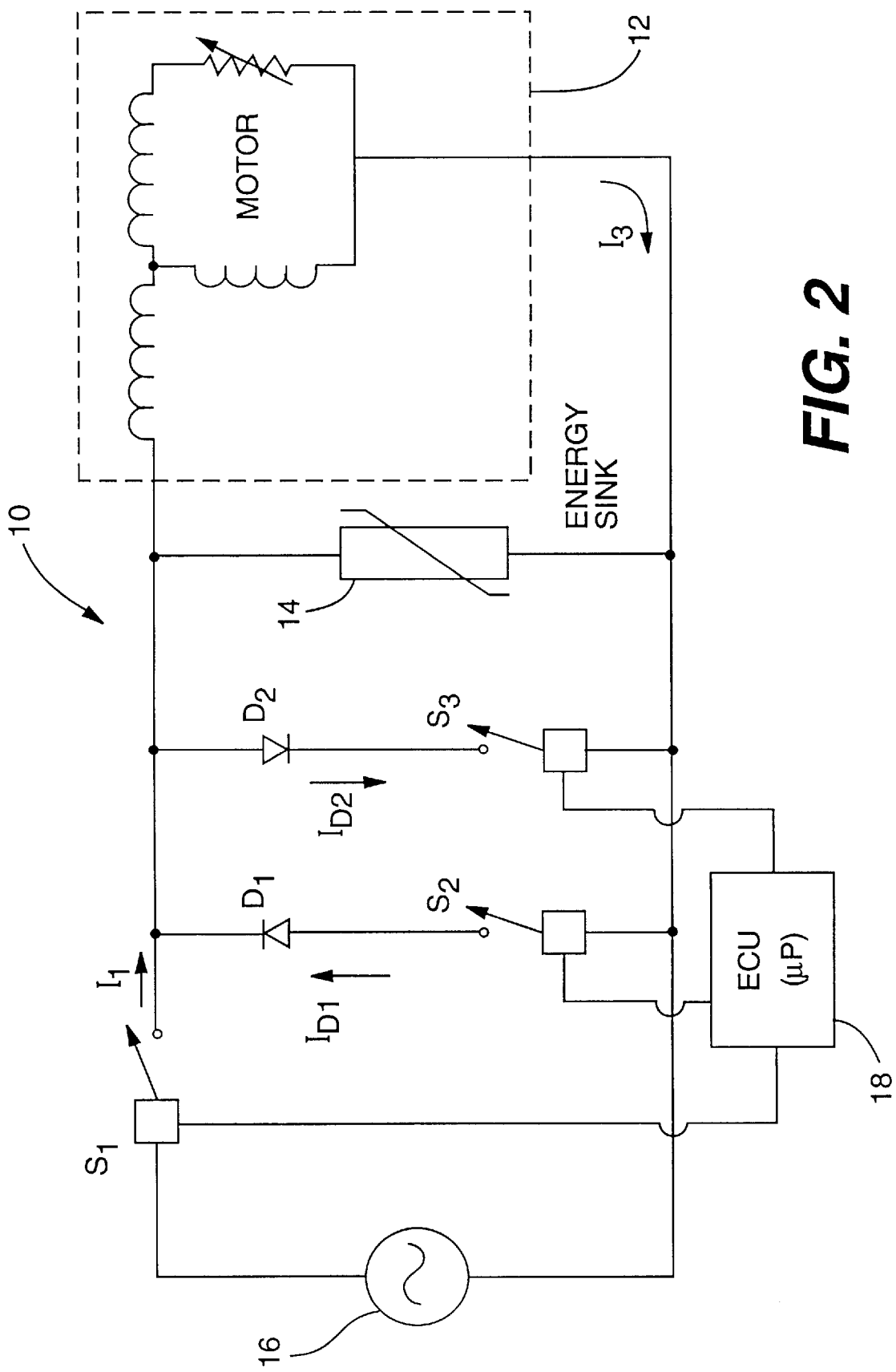
FIG. 2 is a block diagram of a single phase of the motor starter circuit of the present invention.

Referring now to FIG. 2, there is shown generally by reference numeral 10 a block diagram of an embodiment of the motor starter circuit of the present invention implemented for a single phase (i.e., 2 wire) application. In this embodiment, high-speed, solid-state switches, such as IGBTs (i.e. insulated-gate bipolar transistors), are utilized. As described in greater detail below, the use of these switches, rather than regenerative (latching) switches such as SCRs (silicon-controlled rectifiers), eliminates the need for reliance upon line commutation to terminate current flow. Furthermore, by using high-speed switches between the utility power line and the motor, voltage to the motor may be reduced by switching the devices at a much higher frequency than the power line frequency while varying the ratio of "on" (switch closed) to "off" (switch open) time. Simultaneously controlling the conduction of other solid-state switches shunting the motor allows the current to continue flowing during the time that the switches connected to the power line are open. Controlling the starter circuit according to this methodology results in a current transformation wherein the motor current exceeds the line current by the duty cycle (i.e., $t_{on}+t_{off}/t_{on}$) ratio of switch S1. Still further, it should be appreciated that the starter circuit and control methodology of the present invention permit equalized input/output volt-amp (VA) ratings. For example, with a 50% duty cycle, the input VA product equals full line voltage multiplied by 50% motor current, and output VA product equals 50% line voltage multiplied by motor current. Thus, VA input equals VA output.

All presently known motor starters using series elements to limit starting current (inductors, resistors, electrolytic and solid state) require significantly more (i.e., approximately 73%) more current than Wye-Delta or autotransformer starters to provide the same torque. The present invention provides a means by which autotransformer performance can be achieved using solid state devices. Additionally, the effective current transformation ratio can be changed electronically. This can be done rapidly and continuously even while the starting process is occurring, resulting in advantages over prior art approaches.

Referring once again to FIG. 2, the motor starter circuit 10 includes a plurality of solid state switches $S_1$, $S_2$, and $S_3$, diodes $D_1$ and $D_2$, a motor shown generally by reference numeral 12, and an energy sink 14. The motor starter circuit 10 is electrically connected to an AC power source 16 which generates a well-known sinusoidal voltage waveform with characteristic positive and negative voltage alternations which result in positive and negative current alternations in the load. A switch controller, such as ECU 18 (which includes a microprocessor or the like not specifically shown for the sake of clarity) controls cycling of the switches $S_1$, $S_2$, and $S_3$, according to a control strategy, discussed in greater detail hereinbelow, and embodied in software executed by the microprocessor.

In the preferred embodiment, switch $S_1$ is a bidirectional solid state switch positioned between the power source 16 and the motor 12 and is electrically connected in series therewith as shown in FIG. 2. This switch is controlled by the ECU 18 to repetitively cycle between a closed state during which current flows through the switch to the motor 12 and an open state during which current does not flow through the switch. It should be appreciated that operation of switch $S_1$ in this manner functions to provide pulse-width-modulated current to the motor 12.

As shown in FIG. 2, switch $S_2$ is a solid state switch and is electrically connected in series with diode $D_1$. Similarly, switch $S_3$ and diode $D_2$ are electrically connected in series. In one embodiment, switches $S_2$ and $S_3$ are unidirectional switches. These series-connected switch-diode combinations, which are positioned between switch $S_1$ and the motor 12, are electrically connected in parallel relative to each other and in parallel with the motor. Preferably, diodes $D_1$ and $D_2$ are wired so that when one is forward biased and capable of carrying current the other is disconnected or reverse biased and unable to carry current.

Figure 3A:
FIG. 3a is a graphical illustration of the line current ($I_1$) and motor current ($I_3$) in the circuit shown in FIG. 2.

Motor starting current is obtained from the power source 16 by continuously cycling switch $S_1$ open and closed. This switching is preferably done at frequencies considerably higher than that of the line current. For example, for an AC line voltage with a frequency of 60 Hz, switch $S_1$ may be switched at a frequency ranging from about 1.2 kHz to about 18 kHz. Of course, other switch frequencies are possible. Although the ratio of time switch $S_1$ is open to the time it is closed may vary depending on the particular application, for purposes of this discussion and as shown in FIG. 3a, switch $S_1$ is closed for about 40% of the time and open for about 60% of the time for both positive and negative current alternations. It can be seen from FIG. 3a that the magnitude of each current pulse $I_1$ increases as the line voltage increases for both positive and negative alternations.

During positive motor current alternations, switch $S_2$ is maintained in a closed position and switch $S_3$ is maintained in an open position. Initially, current flowing through switch $S_1$ (shown in FIGS. 2 and 3a as $I_1$) to the motor increases until switch $S_1$ opens. Until switch $S_1$ opens neither diode carries current since switch $S_3$ is open and diode $D_1$ is reverse biased. When switch $S_1$ opens, diode $D_1$ becomes forward biased as a result of the energy provided by the inductance of the motor 12, and the current flowing in the motor (shown in FIGS. 2 and 3a as $I_3$) flows through $S_2$ and $D_1$. Current continues to flow through $D_1$ and the motor until the next closure of switch $S_1$. At that point in time, diode $D_1$ becomes reverse biased once again and ceases carrying motor current. Current flow from the power source 16 to the motor 12 resumes until the next opening of switch $S_1$.

With continuing reference to FIGS. 2 and 3a, during negative motor current alternations, switch $S_2$ is maintained in an open position and switch $S_3$ is maintained in a closed position. When $S_1$ is closed, line current $I_1$ is permitted to flow through the motor 12. Neither of the diodes carry current since $S_2$ is open and diode $D_2$ is reverse biased. When $S_1$ opens, however, diode $D_2$ becomes forward biased and the current flowing in the motor (shown as $I_3$) flows through $S_3$ and $D_2$. Current continues to flow through $D_2$ and the motor until the next closure of $S_1$. At that point in time, $D_2$ becomes reverse biased once again and ceases carrying motor current. Current flow from the power source 16 to the motor 12 resumes until the next opening of $S_1$.

Figure 3B:
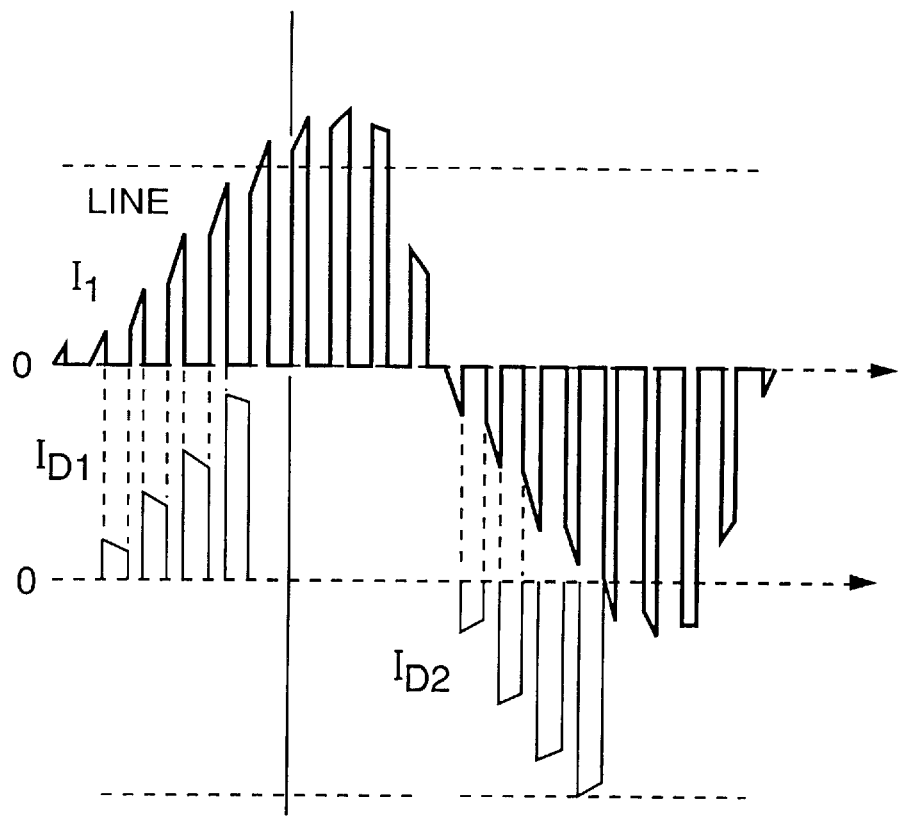
FIG. 3b is a graphical illustration of the line current ($I_1$) and diode currents ($I_{D1}$ and $I_{D2}$) in the circuit shown in FIG. 2.

Turning now to FIG. 3b, there is a graphical illustration of the relationship between line current ($I_1$) and the diode current pulses (shown therein as $I_{D1}$ and $I_{D2}$). $I_{D1}$ represents the current flowing through diode $D_1$ when switch $S_1$ is open during positive motor current alternations. Similarly, $I_{D2}$ represents the current flowing through diode $D_2$ when switch $S_3$ is open during negative motor current alternations. As shown, current flows through diodes $D_1$ and $D_2$ only when there is no line current, i.e., when switch $S_1$ is open. The magnitude of each current pulse $I_{D1}$ and $I_{D2}$ has a maximum value (approximately equal to that of $I_1$) when switch $S_1$ opens, and gradually decreases over time until $S_1$ closes.

Referring once again to FIG. 2, the present invention also contemplates use of energy sink 14 at low power factors to either store or dissipate the reactive energy trapped in the motor at the beginning of each current reversal until the next possible conduction period, i.e., when voltage and current are correctly polarized. As is known, power factor can be defined as the ratio of real power (Watts) to apparent power (Volt-Amps). For purposes of this discussion, energy sink 14 would typically be used for a power factor of 20%, which may be encountered during starting. The power factor typically reaches a final value (approximately 90%) within about 90 seconds. The energy sink is graphically represented in FIG. 2 as a metal-oxide varistor, although other devices capable of dissipating the reactive energy may be used, including resistors. It should be appreciated that while the energy sink 14 is shown as a dissipative device, the reactive energy may also be stored in an appropriate storage device, such as a capacitor, and returned to the energy source using a converter/invertor. Such a converter/invertor is well known in the art, and as such, is not specifically illustrated.

Figure 4:
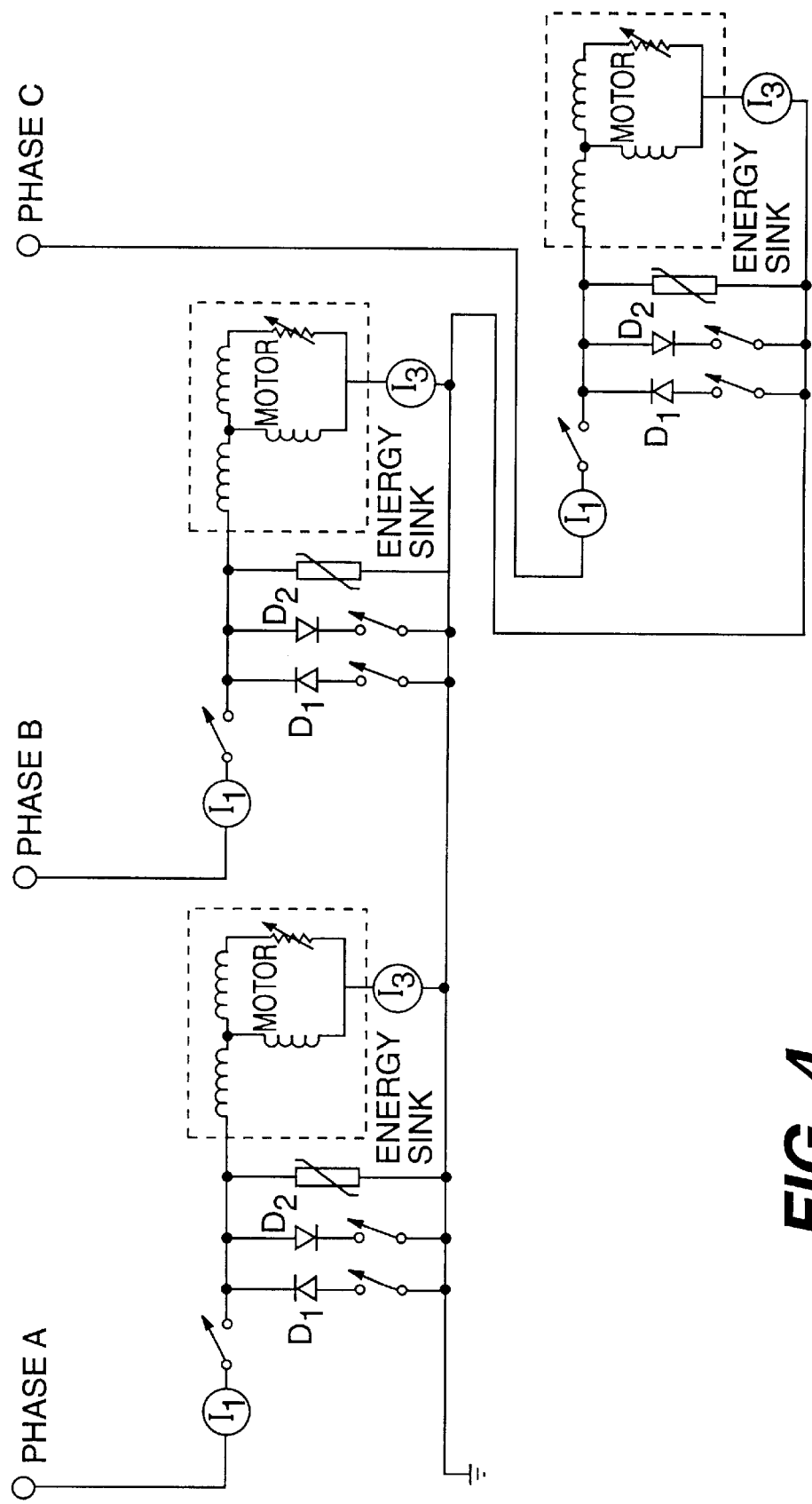
FIG. 4 is a block diagram of the three phase motor starter circuit of the present invention configured for operation with a Wye-connected motor.
Figure 5:
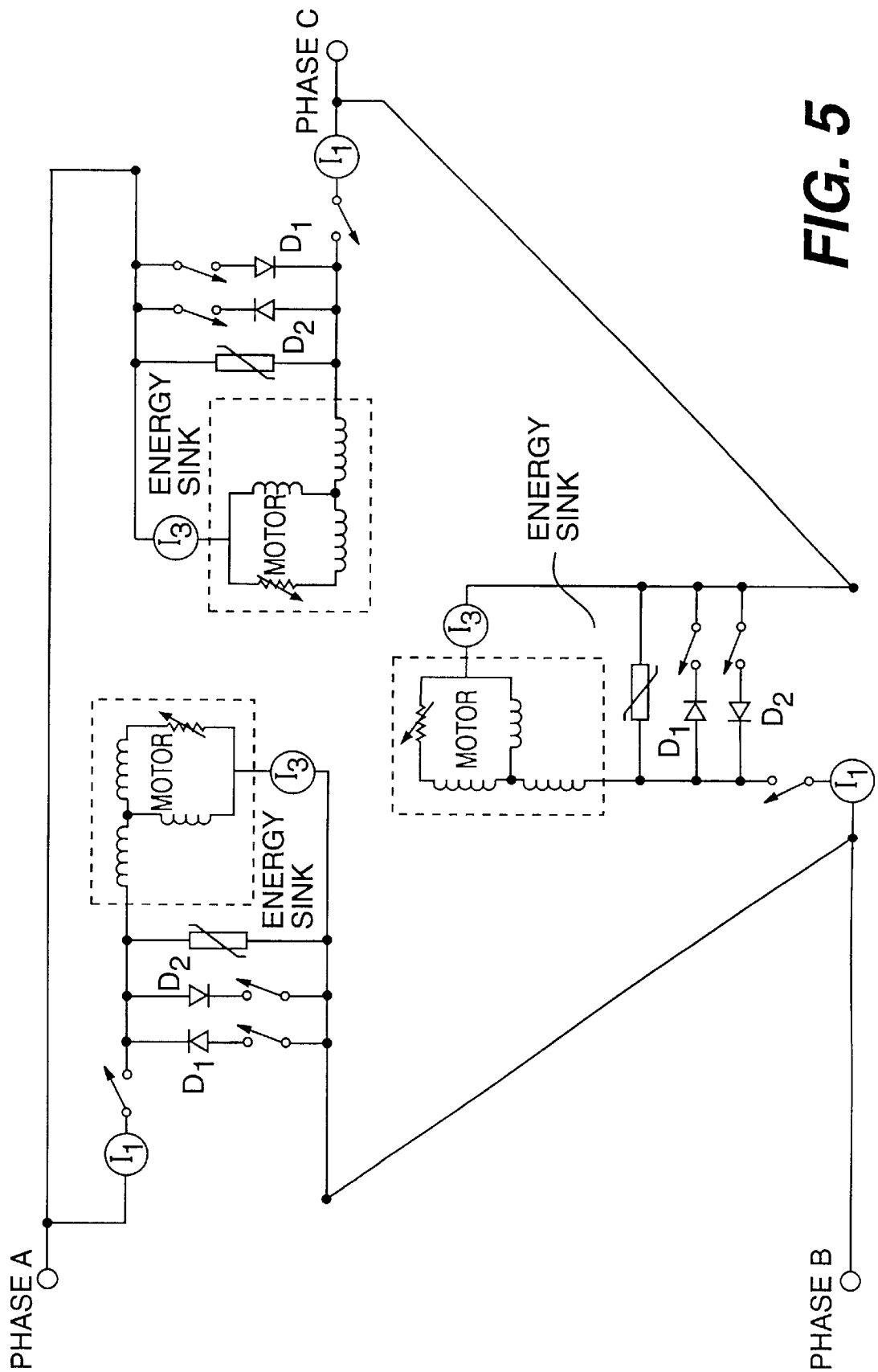
FIG. 5 is a block diagram of the three phase motor starter circuit of the present invention configured for operation with a Delta-connected motor.

Referring now to FIGS. 4 and 5, there are shown block diagrams of the starter circuit of the present invention configured for operation as a three phase (i.e., 3 wire) starter for Wye connected and Delta connected motors, respectively. As shown in these figures, the circuit shown in FIG. 2 is repeated for each wire or phase. For simplicity, the Wye connection is shown as utilizing a common or ground connection. In actual use, however, the starter and the motor commons are not required to be interconnected.

Figure 6:
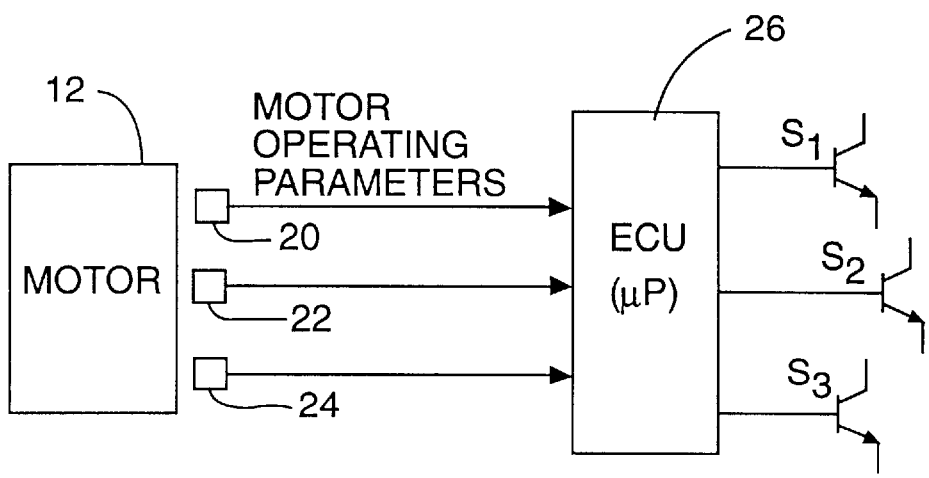
FIG. 6 is a simplified block diagram of a controller, for use with the starter circuit shown in FIG. 2, including a plurality of sensors for sensing motor operating parameters.

Since the duty cycle can be selectively varied by controlling the cycling of the switches in the manner described above, the amount of line current drawn during starting can be varied so as to achieve the optimum, or any desired, result. Indeed, the amount of current drawn by a motor can be progressively changed during the start-up procedure. As shown in FIG. 6, the present invention also contemplates use of one or more sensors shown generally by reference numerals 20, 22, and 24, which sense operational parameters of the motor 12 during start-up. Although three sensors are shown, a greater or fewer number of sensors may be used. The motor operating parameters sensed by sensors 20, 22, and 24 might include inter alia acceleration, velocity, torque, amperes, and volts, just to name a few. Of course, which parameters are monitored will depend in large part on the particular application and numerous other operating parameters than those specified herein can be monitored with the appropriate sensor.

Signals from these sensors are applied to and used by a switch controller such as ECU 26 which includes a microprocessor or the like (not specifically shown for the sake of clarity), which in turn controls closure of switches $S_1$, $S_2$ and $S_3$, as a function of the sensed parameters. In this embodiment, it should be appreciated that the microprocessor is programmed to control switch closure in a manner that generates a desired line current profile throughout the motor starting process. Yet another advantage associated with this embodiment is that the cycling of switches can be controlled to achieve lower starting current regardless of motor type.

It should be appreciated by one of ordinary skill in this art that by coordinating the conduction of free-wheeling diodes so that motor current may be circulated in opposite directions in conjunction with each alternation of the input utility power, one can implement AC voltage/current transformation similar to that obtained with an autotransformer starter, but with the added capability of continuously adjustable turns ratios. As shown in FIG. 3a, motor current $I_3$ is generally continuous with some ripple despite the fact that line current provided to the motor is discontinuous. It should also be appreciated that with the present invention, the performance advantage of Wye/Delta and autotransformer starters (i.e., lowest starting amperes) is equaled with a solid-state starter. Furthermore, in the majority of cases where low starting torque is required, superior performance (lower starting amperes with minimum acceleration time) is achieved by, for example, changing ratios during the acceleration period in response to torque demand and acceleration rate.

As previously noted, the starter motor starter current minimization scheme of the present invention enables equalized input VA product and output VA product. More particularly, as explained herein, input current fluctuates from peak to zero with an average value that is a function of the duty cycle ratio while input voltage stays constant. To the contrary, output current is maintained by the diodes $D_1$ and $D_2$ at full peak level and is not averaged while the voltage is reduced as a function of the duty cycle ratio. Thus, input VA equals output VA.

All known prior art starters, whether solid state, resistive, or inductive do not share this feature, with the exception of the autotransformer. Generally, known motor starters do not supply a level of RMS motor current which exceeds the RMS current drawn from the power line. This lack of input current reduction causes the input VA product to exceed the output VA product. The present invention, as described herein, employs a current transformation technique to reduce the amount of current drawn by the motor from the line during starting. While similar results may be achievable with an autotransformer, there are attendant disadvantages. For example, autotransformers are relatively inflexible. The turns ratio of an autotransformer is established up front and remains fixed. With the present invention, the duty cycle and therefore the extent of the current transformation can be adjusted during motor starting.

In one application, the present invention would replace the known "reduced voltage" starter used to connect a large chiller compressor motor to the utility power line and accelerate it to operating speed. In presently utilized solid state starters, the needed "reduced voltage" is provided by placing SCRs between the motor and the power line and controlling the voltage applied to the motor terminals by reducing the time each SCR is allowed to conduct. While similar in operation to the light dimmers commonly found in homes and restaurants for dimming lamps, unfortunately all of the current flowing to the load (i.e., the lamp) must also flow from the utility power lines.

The present invention, on the other hand, allows a "current transformation" in proportion to the duty cycle of the PWM. This allows the current flowing in the load to be significantly greater than the current flowing in the power lines. Specifically, a possible starting sequence would include a low duty cycle (e.g., 43%) at the moment of initiation of acceleration. After a specified period of time (e.g., 45 seconds), the duty cycle would be increased to 100%, applying full power line voltage to the motor. In a more sophisticated sequence, the starting duty cycle could be much lower (e.g. a few percent) and be allowed to increase at a controlled rate until the motor begins to accelerate. During the acceleration process, the duty cycle could be continuously adjusted to optimize the process (minimum current/time). For this level of control, feedback signals representing for example current and speed would be required.

It will be apparent to those skilled in this art that various modifications and variations can be made in the starter circuit and control strategy of the present invention without departing from the spirit and scope of the invention. Other embodiments of the invention will be apparent to those skilled in this art from consideration of the specification and practice of the invention disclosed herein. It is intended that the specification and examples be considered exemplary only, with a true scope and spirit of the invention being indicated by the following claims.

We claim:

1. For use with a multi-phase power source providing positive and negative voltage alternations resulting in positive and negative current alternations and a multi-phase motor, a starter circuit for the motor for minimizing the amount of current drawn by the motor from the power source during starting of the motor, the motor starter circuit comprising:

a first switch through which bidirectional line current from the power source is provided to the motor;

a pair of switch-diode combinations electrically configured to carry current in the motor when the first switch is in an open position; and a controller for controlling the first switch to cycle between an open and a closed position, and for controlling the pair of switch-diode combinations to alternately carry the current in the motor when the first switch is open based on the polarity of the motor current alternation, thereby effecting a current transformation wherein the starting current drawn is reduced from the available line current in proportion to the duty cycle of the first switch so as to minimize the current drawn by the motor during starting.

2. The motor starter circuit of claim 1 further comprising an energy sink disposed between the first switch and the motor and electrically connected parallel therewith, for use at low power factor values.

3. The motor starter circuit of claim 2 wherein the energy sink is a dissipative device.

4. The motor starter circuit of claim 2 wherein the energy sink is a storage device.

5. The motor starter circuit of claim 1 further comprising at least one sensor for sensing an operating parameter of the motor, wherein the controller controls the switches based on the sensed operating parameter.

6. For use with a multi-phase power source providing positive and negative voltage alternations resulting positive and negative current alternations and a multi-phase motor, a starter circuit for the motor for minimizing the amount of current drawn by the motor from the power source during starting of the motor, the motor starter circuit comprising, for each phase:

a bidirectional solid-state switch disposed between the power source and the motor and electrically connected in series therewith;

a first solid-state switch electrically connected in series with a first diode, the first switch and first diode being disposed between the bidirectional switch and the motor and electrically connected in parallel therewith;

a second solid-state switch electrically connected in series with a second diode, the second switch and second diode being disposed between the bidirectional switch and the motor and electrically connected parallel therewith, the second diode being electrically connected so as to be forward biased when the first diode is reverse biased and reverse biased when the first diode is forward biased;

a controller programmed to cycle the bidirectional switch between an open state and a closed stated so as to provide pulse-width-modulated current to the motor, to maintain the first switch in a closed position and the second switch in an open position during positive motor current alternations such that when the bidirectional switch is in an open state, the first diode carries current from the motor, and to maintain the first switch in an open position and the second switch is maintained in a closed position during negative motor current alternations such that when the bidirectional switch is in an open state, the second diode carries current from the motor, thereby effecting a current transformation wherein the starting current is reduced from the available line current in direct proportion to the duty cycle of the bidirectional switch so as to minimize the current drawn by the motor during starting.

7. The motor starter circuit of claim 6 further comprising an energy sink, disposed between the bidirectional switch and the motor and electrically connected parallel therewith, for use at low power factor values.

8. The motor starter circuit of claim 7 wherein the energy sink is a dissipative device.

9. The motor starter circuit of claim 7 wherein the energy sink is a storage device.

10. The motor starter circuit of claim 6 further comprising at least one sensor for sensing an operating parameter of the motor, wherein the controller controls the switches based on the sensed operating parameter.

11. For use with a power source providing positive and negative voltage alternations resulting in positive and negative current alternations and a motor, a starter circuit for the motor for minimnizing the amount of current drawn by the motor from the power source during starting of the motor, the motor starter circuit comprising:

a bidirectional solid-state switch disposed between the power source and the motor and electrically connected in series therewith;

a first solid-state switch electrically connected in series with a first diode, the first switch and first diode being disposed between the bidirectional switch and the motor and electrically connected in parallel therewith;

a second solid-state switch electrically connected in series with a second diode, the second switch and second diode being disposed between the bidirectional switch and the motor and electrically connected parallel therewith, the second diode being electrically connected so as to be forward biased when the first diode is reverse biased and reverse biased when the first diode is forward biased;

a controller programmed to cycle the bidirectional switch between an open state and a closed stated so as to provide pulse-width-modulated current to the motor, to maintain the first switch in a closed position and the second switch in an open position during positive motor current alternations such that when the bidirectional switch is in an open state, the first diode carries current from the motor, and to maintain the first switch in an open position and the second switch in a closed position during negative motor current alternations such that when the bidirectional switch is in an open state, the second diode carries current from the motor, thereby effecting a current transformation wherein the starting current is reduced from the available line current in direct proportion to the duty cycle of the first switch so as to minimize the current drawn by the motor during starting.

12. The motor starter circuit of claim 11 further comprising an energy sink, disposed between the bidirectional switch and the motor and electrically connected parallel therewith, for use at low power factor values.

13. The motor starter circuit of claim 12 wherein the energy sink is a dissipative device.

14. The motor starter circuit of claim 12 wherein the energy sink is a storage device.

15. The motor starter circuit of claim 11 further comprising at least one sensor for sensing an operating parameter of the motor, wherein the controller controls the switches based on the sensed operating parameter.

16. A method, for use with a starter circuit for a multi-phase motor and a multi-phase power source providing positive and negative voltage alternations resulting in positive and negative current alternations, for minimizing the amount of current drawn by the motor from the power source during starting of the motor, the starter circuit including a controller, a bidirectional solid-state switch disposed between the power source and the motor and electrically connected in series therewith, a first solid-state switch electrically connected in series with a first diode, the first switch and first diode being disposed between the bidirectional switch and the motor and electrically connected in parallel therewith, and a second solid-state switch electrically connected in series with a second diode, the second switch and second diode being disposed between the bidirectional switch and the motor and electrically connected parallel therewith, the second diode being electrically connected so as to be forward biased when the first diode is reverse biased and reverse biased when the first diode is forward biased, the method comprising:

cycling, by the controller, the bidirectional switch between an open state and a closed stated so as to provide pulse-width-modulated current to the motor, during positive motor current alternations, maintaining the first switch in a closed position and the second switch in an open position such that when the bidirectional switch is in an open state, the first diode carries current from the motor, during negative motor current alternations, maintaining the first switch in an open position and the second switch in a closed position such that when the bidirectional switch is in an open state, the second diode carries current from the motor, thereby effecting a current transformation wherein the starting current is reduced from the available line current in direct proportion to the duty cycle of the bidirectional switch so as to minimize the current drawn by the motor during starting.

* * * * *

UNITED STATES PATENT AND TRADEMARK OFFICE

PATENT NO. : 5,838,144
DATED : November 17, 1998
INVENTOR(S) : Frank E. Wills, et al.

It is certified that error appears in the above-identified patent and that said Letters Patent is hereby corrected as shown below:

Title page, item [63], insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 3 | 9 | 8 | 7 | 3 | 5 | 7 | 10/19/76 | Edstrom et al | 323 | 17 | |
| | | 5 | 4 | 9 | 8 | 9 | 4 | 6 | 03/12/96 | Plumer et al | 318 | 809 | |
| | | | | | | | | | | | | | |

FOREIGN PATENT OR PUBLISHED FOREIGN PATENT APPLICATION

| | | DOCUMENT NUMBER | | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|---|
| | 0 | 2 | 2 | 1 | 5 | 7 | 4 | A 2 | 05/13/87 | Europe | H02M | 5/293 | | |
| DE | 4 | 4 | 2 | 8 | 6 | 8 | 2 | A 1 | 02/15/96 | Germany | H02M | 7/48 | | |
| | | | | | | | | | | | | | | |

Signed and Sealed this

Seventh Day of December, 1999

Attest:

*Attesting Officer*

Q. TODD DICKINSON

*Acting Commissioner of Patents and Trademarks*